United States Patent
Lee (10) Patent No.: US 11,911,952 B2
(45) Date of Patent: Feb. 27, 2024

(54) INSULATION SHEET FORMING APPARATUS

(71) Applicants: HYUNDAI MOTOR COMPANY, Seoul (KR); Kia Corporation, Seoul (KR)

(72) Inventor: Sang Jin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 38 days.

(21) Appl. No.: 17/681,055

(22) Filed: Feb. 25, 2022

(65) Prior Publication Data
US 2022/0388231 A1    Dec. 8, 2022

(30) Foreign Application Priority Data
Jun. 4, 2021  (KR) .................. 10-2021-0072906

(51) Int. Cl.
*B29C 59/04*    (2006.01)
*B29C 59/00*    (2006.01)
*B29L 7/00*    (2006.01)

(52) U.S. Cl.
CPC ............ *B29C 59/04* (2013.01); *B29C 59/002* (2013.01); *B29L 2007/001* (2013.01); *B29L 2007/007* (2013.01)

(58) Field of Classification Search
CPC ....... B29C 59/04; B29C 59/002; B29C 53/48; B29C 53/06; B29C 53/063; B29C 53/066; B29L 2007/001; B29L 2007/007; H02K 15/10; H02K 3/345; B65H 20/02; B65H 45/08; B65H 2301/44318; B65H 2701/19
See application file for complete search history.

(56) References Cited

U.S. PATENT DOCUMENTS

| | | | | |
|---|---|---|---|---|
| 3,067,806 A * | 12/1962 | Trelease | .................. | B29C 59/02 156/203 |
| 4,080,878 A * | 3/1978 | Gallagher | ................. | B31F 1/10 425/363 |
| 4,213,550 A * | 7/1980 | Bonaddio | ............... | C03B 33/10 225/2 |
| 6,564,444 B1 | 5/2003 | Ponzio et al. | | |
| 2007/0261247 A1* | 11/2007 | Briese | ................. | E06B 3/67313 29/897.3 |
| 2020/0147857 A1* | 5/2020 | Ponzio | .................... | B29C 53/06 |

FOREIGN PATENT DOCUMENTS

EP    1 061 635 B1    12/2004

* cited by examiner

*Primary Examiner* — Jeffrey M Wollschlager
(74) *Attorney, Agent, or Firm* — MORGAN, LEWIS & BOCKIUS LLP (57) ABSTRACT

An insulation sheet forming apparatus that forms an insulation sheet having one or more bent regions includes an unwinding module; a preforming module configured to form a preforming region on the insulation sheet supplied from the unwinding module; and a bending module configured to form the bent region on the insulation sheet by bending the insulation sheet supplied from the preforming module, in which the preforming module has a width which is adjustable in a width direction that intersects a movement direction of the insulation sheet.

19 Claims, 8 Drawing Sheets

INSULATION SHEET FORMING APPARATUS

CROSS-REFERENCE TO RELATED APPLICATION

The present application claims priority to Korean Patent Application No. 10-2021-0072906 filed on Jun. 4, 2021, the entire contents of which is incorporated herein for all purposes by this reference.

BACKGROUND OF THE INVENTION

Field of the Invention

The present invention relates to an insulation sheet forming apparatus, and to an insulation sheet forming apparatus which may be used to manufacture an insulation sheet to be provided in a motor.

Description of Related Art

An insulation sheet made of an insulating material is sometimes inserted and disposed in an electric motor to ensure performance in insulating a coil provided in the electric motor. Generally, processes of i) unwinding the insulation sheet and supplying the insulation sheet, ii) cutting the insulation sheet, iii) bending the insulation sheet so that the insulation sheet has a predetermined shape, and then iv) inserting the insulation sheet having the predetermined shape into a slot of the motor are performed to insert the insulation sheet into the motor.

However, an insulation sheet forming apparatus in the related art inevitably manufactures an insulation sheet having only one shape. In the instant case, separate insulation sheet forming apparatuses need to be provided when insulation sheets with various shapes are required to manufacture various types of motors, which causes severe inefficiency in terms of cost and time.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an insulation sheet forming apparatus configured for forming insulation sheets having various shapes and configured to be inserted into motors.

Various aspects of the present invention provide an insulation sheet forming apparatus, which forms an insulation sheet having one or more bent regions, the insulation sheet forming apparatus including: an unwinding module configured to unwind and supply the insulation sheet; a preforming module configured to form a preforming region on the insulation sheet by pressing a partial region of the insulation sheet to form the one or more bent regions on the insulation sheet supplied from the unwinding module; and a bending module configured to form the one or more bent regions on the insulation sheet by bending the insulation sheet around the preforming region formed on the insulation sheet supplied from the preforming module, in which the preforming module includes: an upper preforming portion disposed at an upper side of the preforming module; and a lower preforming portion disposed below the upper preforming portion, and the preforming module has a width which is adjustable in a width direction that intersects a movement direction of the insulation sheet.

The upper preforming portion may include two upper extension members extending in the movement direction of the insulation sheet and spaced from each other in the width direction, the lower preforming portion may include two lower extension members extending in the movement direction of the insulation sheet and spaced from each other in the width direction, and at least one of the two upper extension members may be movable in the width direction to adjust a distance between the two upper extension members or at least one of the two lower extension members may be movable in the width direction to adjust a distance between the two lower extension members.

The upper preforming portion or the lower preforming portion may be movable in an up-down direction to adjust a distance between the upper preforming portion and the lower preforming portion.

The upper preforming portion may include: one or more upper connecting members disposed between the two upper extension members and each having a first side and a second side coupled to the two upper extension members, respectively; and one or more upper roller members coupled to the upper connecting members and provided to be rotatable about the upper connecting members, respectively, and the lower preforming portion may include: one or more lower connecting members disposed between the two lower extension members and each having a first side and a second side coupled to the two lower extension members, respectively; and one or more lower roller members coupled to the one or more lower connecting members and provided to be rotatable about the lower connecting members, respectively.

The upper roller member and the lower roller member may face each other.

An embossed region protruding outward may be formed on an external circumferential surface vertically formed on the upper roller member, a debossed region facing the embossed region and recessed inward may be formed on an external circumferential surface vertically formed on the lower roller member facing the upper roller member, and a region of the insulation sheet, which is recessed downward by the embossed region, may be inserted into the debossed region.

A debossed region recessed inward may be formed on an external circumferential surface vertically formed on the upper roller member, an embossed region facing the debossed region and protruding outward may be formed on an external circumferential surface vertically formed on the lower roller member facing the upper roller member, and a region of the insulation sheet, which is recessed upward by the embossed region, may be inserted into the debossed region.

The upper roller member may be attachable to and detachable from the upper connecting member or the lower roller member may be attachable to and detachable from the lower connecting member.

The upper roller member may be moved in a longitudinal direction of the upper connecting member or the lower roller member may be movable in a longitudinal direction of the lower connecting member.

The bending module may include a first bending portion, and the first bending portion may include: first guide members disposed at two opposite sides in the width direction of the insulation sheet and configured to guide two opposite portions of the insulation sheet toward the inside in the width direction and move external regions of the insulation sheet inward in the width direction based on preforming regions; and a first pressing member disposed at a downstream side of the first guide member in the movement direction of the insulation sheet and configured to form the one or more bent regions by pressing the preforming regions and portions adjacent to the preforming regions in an up-down direction thereof.

The first bending portion may further include a first forming member disposed at a downstream side of the first pressing member and having therein an internal space through which the insulation sheet passes, and the internal space of the first forming member may have a shape corresponding to a vertical cross-section of the insulation sheet introduced into the first forming member.

A first curved surface region, which protrudes toward the insulation sheet, may be formed on a portion of the first guide member that comes into contact with the insulation sheet.

The bending module may further include a second bending portion, and the second bending portion may include: second guide members disposed at two opposite sides in the width direction of the insulation sheet and configured to guide two opposite portions of the insulation sheet toward the inside in the width direction and move external regions of the insulation sheet inward in the width direction based on preforming regions; and a second pressing member disposed at a downstream side of the second guide member in the movement direction of the insulation sheet and configured to additionally form one or more bent regions by pressing the preforming regions and portions adjacent to the preforming regions in the up-down direction thereof.

The second bending portion may further include a second forming member disposed at a downstream side of the second pressing member and having therein an internal space through which the insulation sheet passes, and the internal space of the second forming member may have a shape different from a vertical cross-section of the insulation sheet, before the insulation sheet passes through the second forming member, to additionally form the one or more bent regions on the insulation sheet having passed through the second forming member.

A second curved surface region, which protrudes toward the insulation sheet, may be formed on a portion of the second guide member that comes into contact with the insulation sheet.

The first forming member may be attachable and detachable.

The second forming member may be attachable and detachable.

Various aspects of the present invention provide an insulation sheet forming apparatus, which forms an insulation sheet having one or more bent regions, the insulation sheet forming apparatus including: a first insulation sheet forming apparatus; and a second insulation sheet forming apparatus, in which the first insulation sheet forming apparatus and the second insulation sheet forming apparatus each include: an unwinding module configured to unwind and supply the insulation sheet; a preforming module configured to form a preforming region on the insulation sheet by pressing a partial region of the insulation sheet to form the one or more bent regions on the insulation sheet supplied from the unwinding module; and a bending module configured to form the one or more bent regions on the insulation sheet by bending the insulation sheet around the preforming region formed on the insulation sheet supplied from the preforming module, in which the preforming module has a width which is adjustable in a width direction W that intersects a movement direction of the insulation sheet, and in which the first insulation sheet forming apparatus and the second insulation sheet forming apparatus are disposed in parallel so that the insulation sheet is selectively supplied to the first insulation sheet forming apparatus or the second insulation sheet forming apparatus.

According to various exemplary embodiments of the present invention, it is possible to provide the insulation sheet forming apparatus configured for forming insulation sheets having various shapes and configured to be inserted into motors.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an insulation sheet forming apparatus according to various exemplary embodiments of the present invention will be described with reference to the drawings.

Insulation Sheet Forming Apparatus

Figure 1:
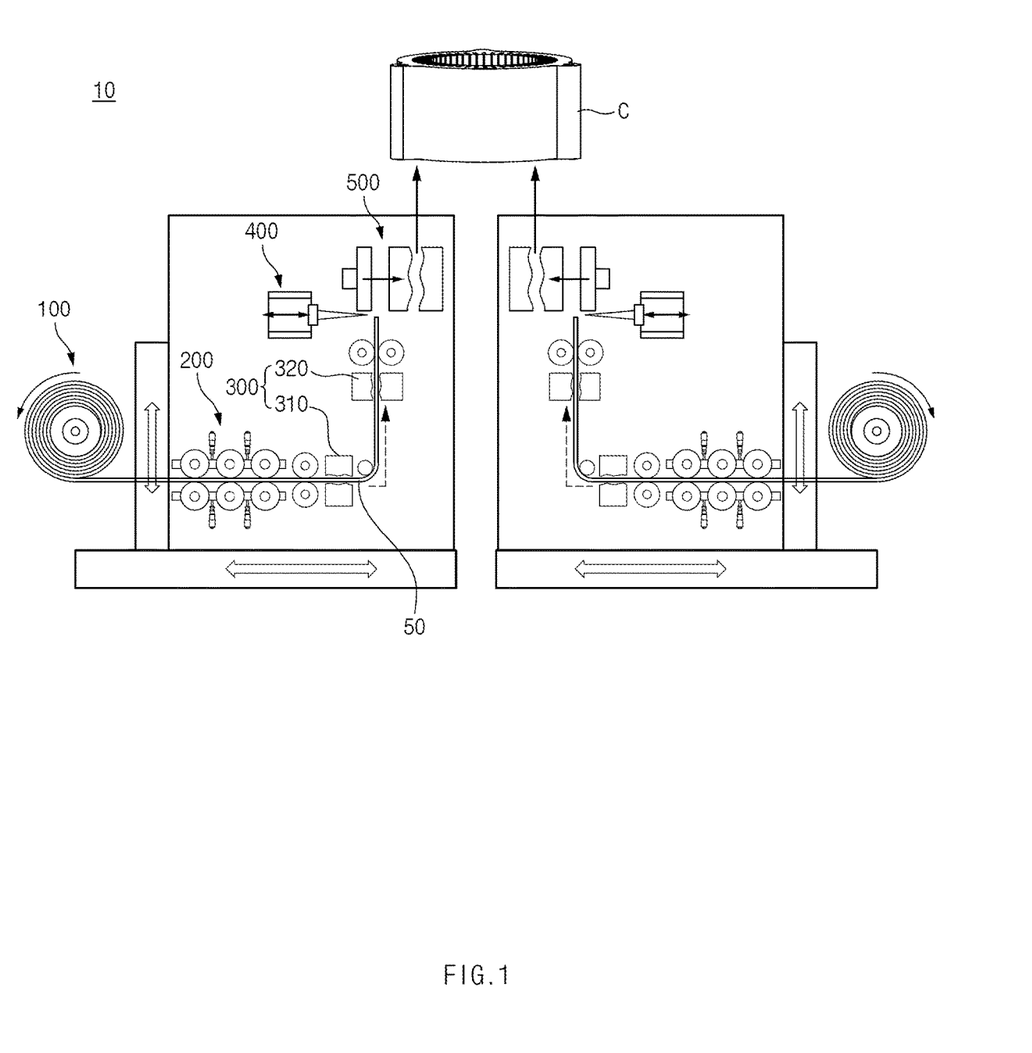
FIG. 1 is a view exemplarily illustrating a structure of an insulation sheet forming apparatus according to various exemplary embodiments of the present invention.
Figure 2:
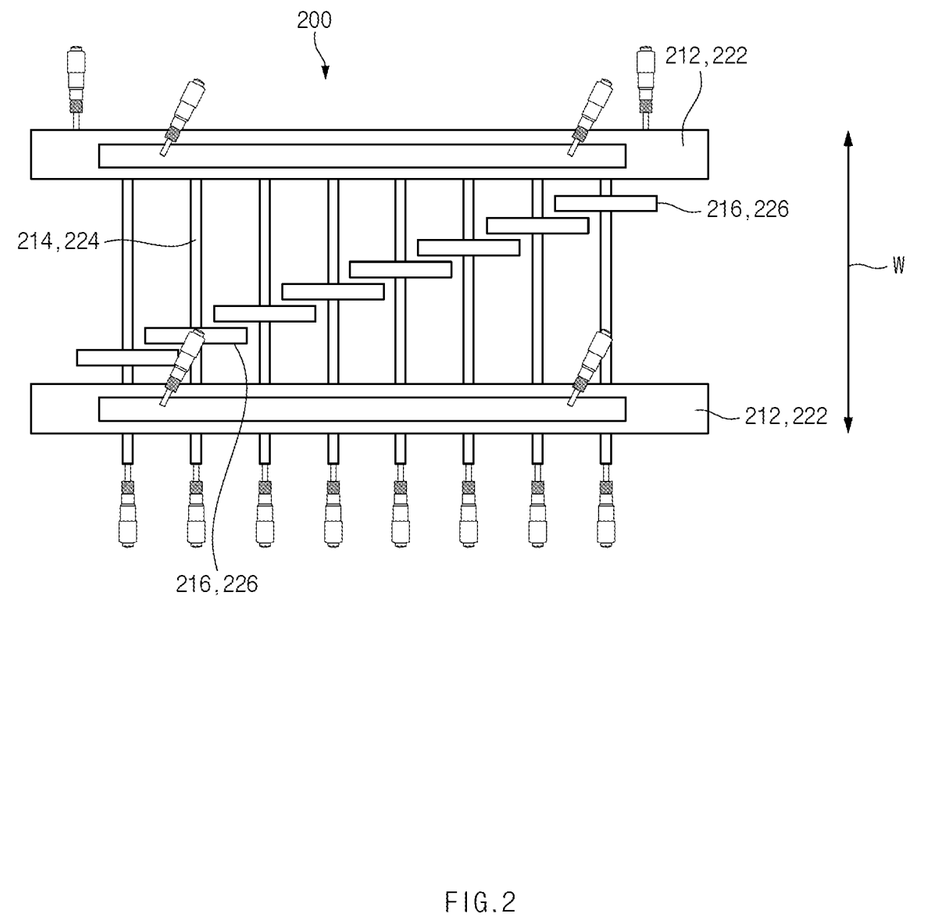
FIG. 2 is a view exemplarily illustrating a preforming module provided in the insulation sheet forming apparatus according to the exemplary embodiment of the present invention.
Figure 3:
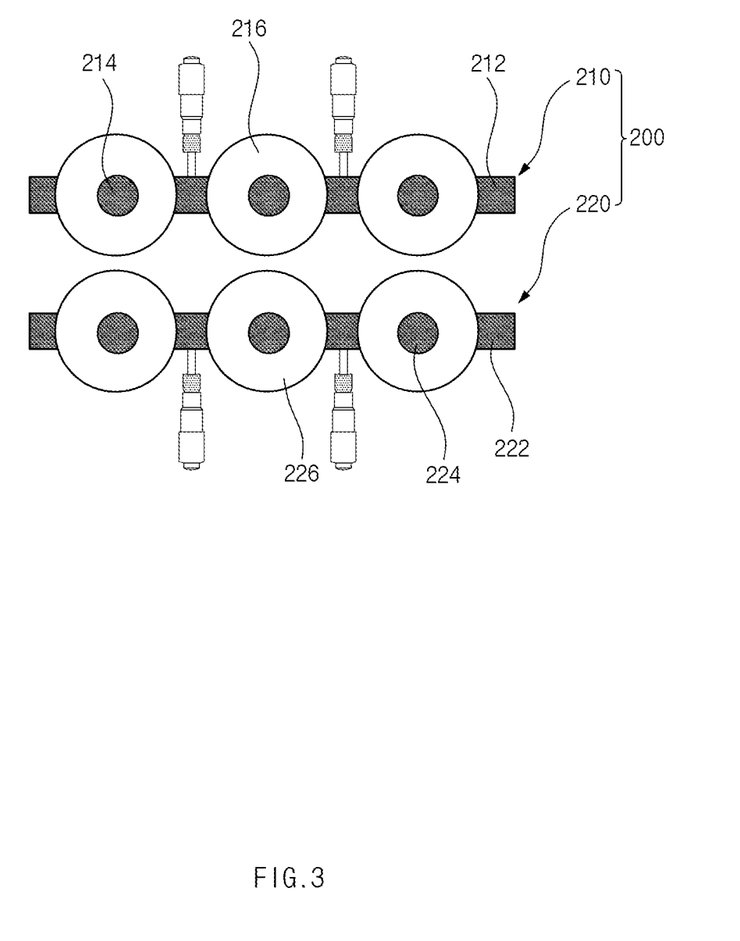
FIG. 3 is a view exemplarily illustrating an upper preforming portion and a lower preforming portion of the preforming module provided in the insulation sheet forming apparatus according to the exemplary embodiment of the present invention.
Figure 4:
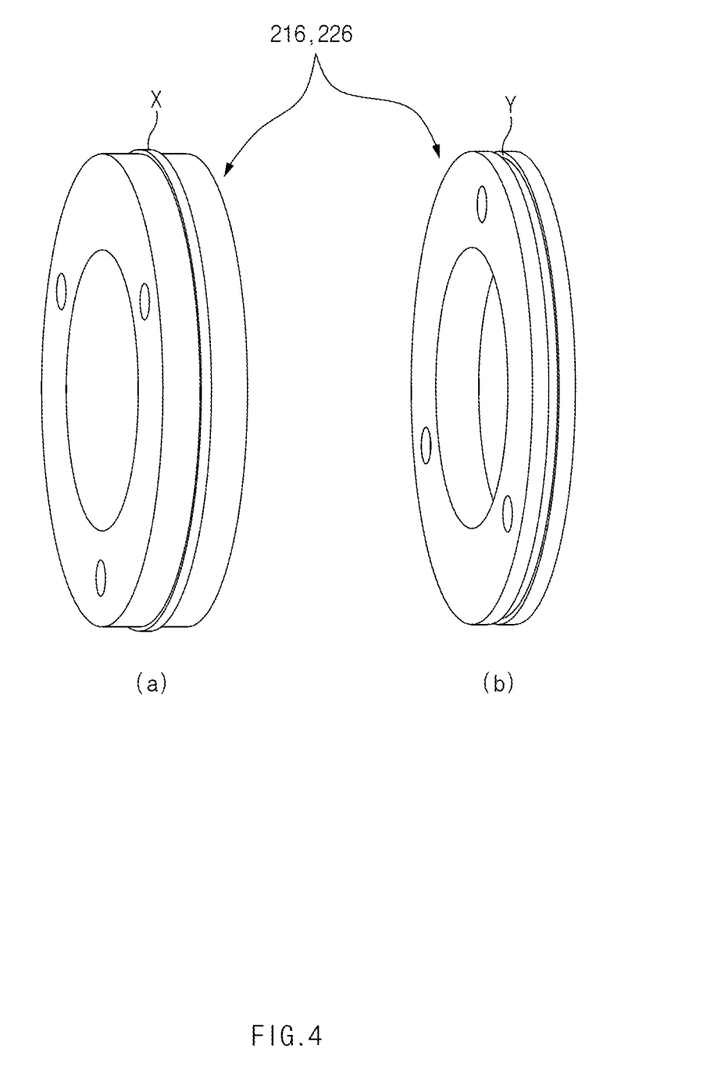
FIG. 4 is a view exemplarily illustrating roller members provided in the insulation sheet forming apparatus according to the exemplary embodiment of the present invention.
Figure 5:
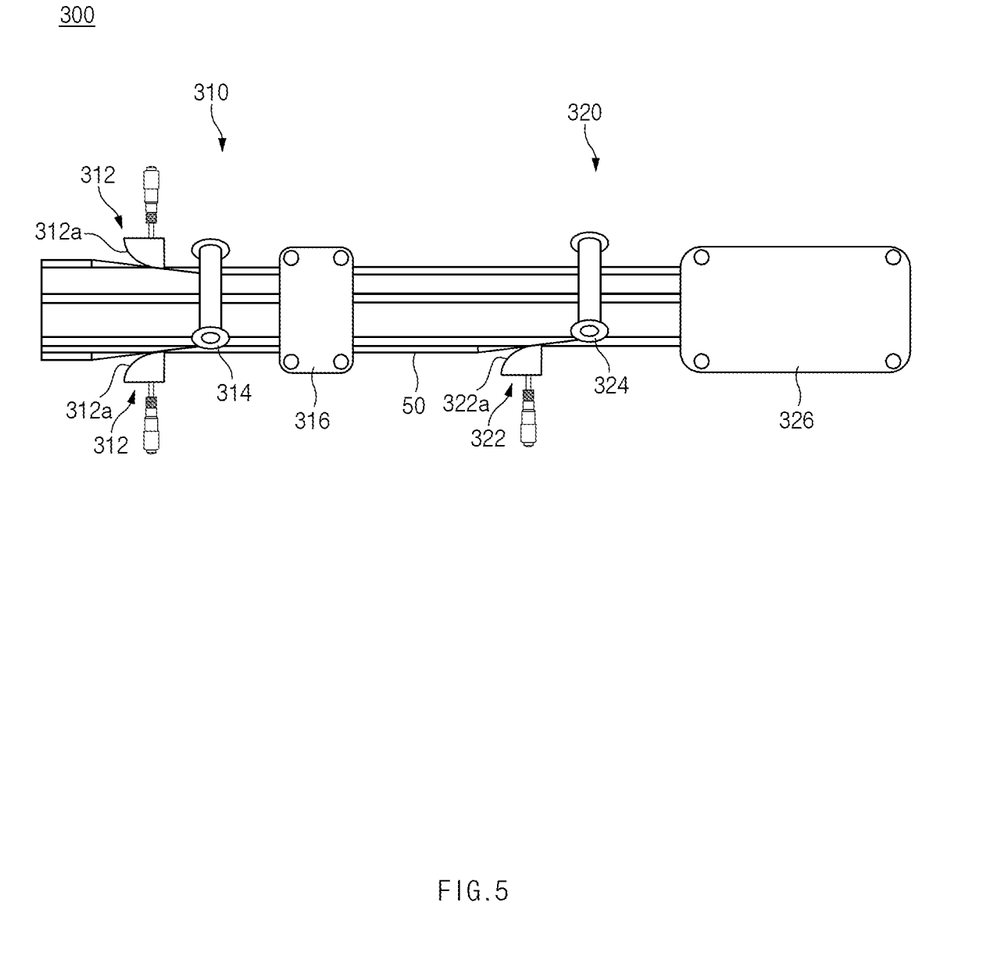
FIG. 5 is a view exemplarily illustrating a bending module according to the exemplary embodiment of the present invention.
Figure 6:
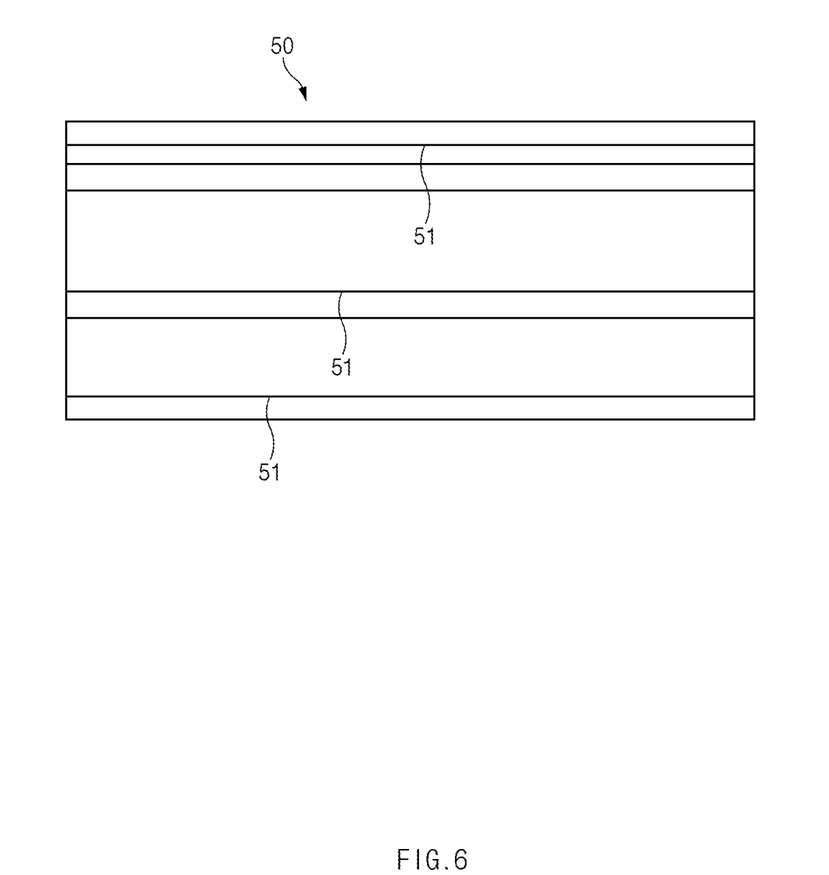
FIG. 6 is a view exemplarily illustrating a state of an insulation sheet immediately after the insulation sheet is discharged from the preforming module in the insulation sheet forming apparatus according to the exemplary embodiment of the present invention.
Figure 7:
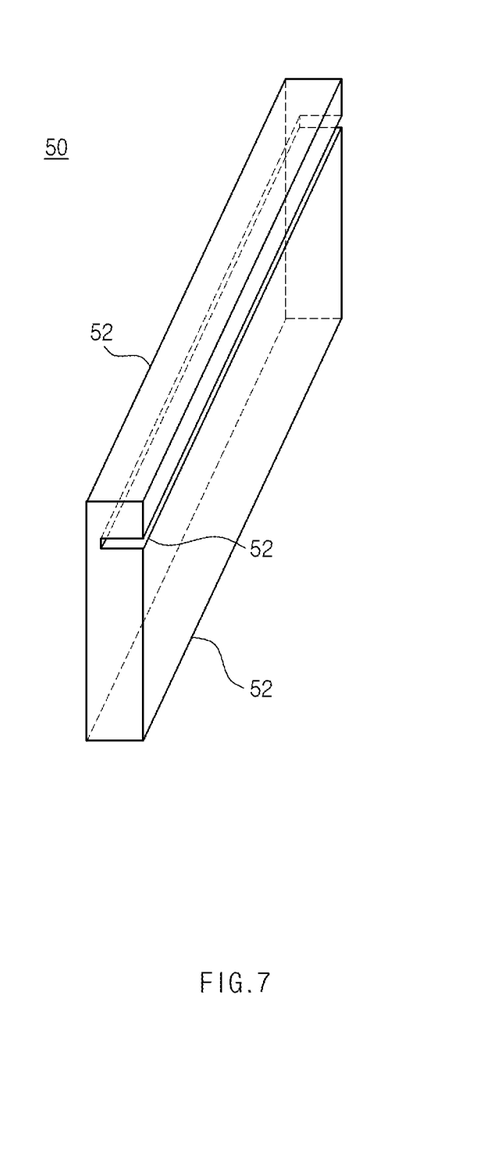
FIG. 7 is a view exemplarily illustrating a state of an insulation sheet immediately after the insulation sheet is discharged from the bending module in the insulation sheet forming apparatus according to the exemplary embodiment of the present invention.

FIG. 1 is a view exemplarily illustrating a structure of an insulation sheet forming apparatus according to various exemplary embodiments of the present invention, and FIG. 2 is a view exemplarily illustrating a preforming module provided in the insulation sheet forming apparatus according to the exemplary embodiment of the present invention. FIG. 3 is a view exemplarily illustrating an upper preforming portion and a lower preforming portion of the preforming module provided in the insulation sheet forming apparatus according to the exemplary embodiment of the present invention, and FIG. 4 is a view exemplarily illustrating roller members provided in the insulation sheet forming apparatus according to the exemplary embodiment of the present invention. FIG. 5 is a view exemplarily illustrating a bending module according to the exemplary embodiment of the present invention, and FIG. 6 is a view exemplarily illustrating a state of an insulation sheet immediately after the insulation sheet is discharged from the preforming module in the insulation sheet forming apparatus according to the exemplary embodiment of the present invention. FIG. 7 is a view exemplarily illustrating a state of an insulation sheet immediately after the insulation sheet is discharged from the bending module in the insulation sheet forming apparatus according to the exemplary embodiment of the present invention.

Referring to FIGS. 1 to 7, an insulation sheet forming apparatus 10 according to various exemplary embodiments of the present invention may be an apparatus of forming an insulation sheet having one or more bent regions. For example, the insulation sheet forming apparatus 10 according to various exemplary embodiments of the present invention may be an apparatus of forming an insulation sheet to be inserted into a stator core C of a motor.

The insulation sheet forming apparatus 10 according to various exemplary embodiments of the present invention may be an apparatus of forming an insulation sheet 50 having one or more bent regions 52. In more detail, the insulation sheet forming apparatus 10 may include: an unwinding module 100 configured to unwind and supply the insulation sheet 50; and a preforming module 200 configured to form a preforming region 51 on the insulation sheet 50 by pressing a partial region of the insulation sheet 50 to form a bent region 52 on the insulation sheet 50 supplied from the unwinding module 100.

The preforming module 200 may be configured to press a partial region of the insulation sheet 50 to form the preforming region 51 having a locally recessed or protruding shape on the insulation sheet 50. That is, the preforming module 200 may be configured to form in advance the preforming region 51 before the bent region 52 is formed on the insulation sheet 50, making it easy to form the bent region 52 later.

Meanwhile, according to various exemplary embodiments of the present invention, the preforming module 200 may have a width which is adjustable in a width direction W that intersects a movement direction of the insulation sheet 50. Therefore, according to various exemplary embodiments of the present invention, the preforming module 200 may cope with a change in width of the insulation sheet 50 supplied to the insulation sheet forming apparatus 10, which makes it possible to manufacture the insulation sheets having various shapes, various sizes, and various bent regions.

In more detail, the preforming module 200 may include an upper preforming portion 210 disposed at an upper side, and a lower preforming portion 220 disposed below the upper preforming portion 210. The insulation sheet 50 may be supplied between the upper preforming portion 210 and the lower preforming portion 220. Furthermore, the upper preforming portion 210 may include two upper extension members 212 extending in the movement direction of the insulation sheet 50 and spaced from each other in the width direction W. The lower preforming portion 220 may include two lower extension members 222 extending in the movement direction of the insulation sheet 50 and spaced from each other in the width direction W.

In the instant case, according to various exemplary embodiments of the present invention, at least one of the two upper extension members 212 may move in the width direction W to adjust a distance between the two upper extension members 212. Alternatively, at least one of the two lower extension members 222 may move in the width direction W to adjust a distance between the two lower extension members 222. Therefore, according to various exemplary embodiments of the present invention, the distance between the two upper extension members 212 or the distance between the two lower extension members 222 is adjusted, which makes it possible to cope with a change in width of the insulation sheet 50 to be supplied to the insulation sheet forming apparatus 10. The distance between two upper extension members 212 and the distance between the two lower extension members 222 may be individually adjusted.

Furthermore, according to various exemplary embodiments of the present invention, the upper preforming portion 210 or the lower preforming portion 220 may move in an upward/downward direction so that a distance between the upper preforming portion 210 and the lower preforming portion 220 may be adjusted. As described above, the insulation sheet 50 may be supplied between the upper preforming portion 210 and the lower preforming portion 220. Therefore, according to various exemplary embodiments of the present invention, a degree to which the insulation sheet 50 is pressed by the preforming module 200 may be controlled by controlling the distance between the upper preforming portion 210 and the lower preforming portion 220, controlling a degree to which the preforming region 51 formed on the insulation sheet 50 is recessed or protrudes.

For example, to increase the degree to which the preforming region 51 is recessed or protrudes, the upper preforming portion 210 or the lower preforming portion 220 may move in the upward/downward direction so that the distance between the upper preforming portion 210 and the lower preforming portion 220 decreases. Thus, the degree to which the upper preforming portion 210 and the lower preforming portion 220 press the insulation sheet 50 may increase. On the other hand, to decrease the degree to which the preforming region 51 is recessed or protrudes, the upper preforming portion 210 or the lower preforming portion 220 may move in the upward/downward direction so that the distance between the upper preforming portion 210 and the lower preforming portion 220 increases. Thus, the degree to which the upper preforming portion 210 and the lower preforming portion 220 press the insulation sheet 50 may decrease. For example, the upper preforming portion 210 and the lower preforming portion 220 may individually move in the up-down direction thereof.

Referring to the drawings, the upper preforming portion 210 may include one or more upper connecting members 214 provided between the two upper extension members 212 and each having one side and the other side coupled to the two upper extension members 212, respectively, and one or more upper roller members 216 coupled to the upper connecting members 214 and configured to be rotatable about the upper connecting members 214, respectively. The upper connecting member 214 and the upper roller member 216 may be provided in plural. The upper connecting members 214 may be spaced from one another in the movement direction of the insulation sheet 50. The upper roller members 216 may be spaced from one another in the movement direction of the insulation sheet 50. Furthermore, the plurality of upper roller members 216 may also be spaced from one another in the width direction W. FIG. 2 and FIG. 3 illustrate that the plurality of upper connecting members 214 and the plurality of upper roller members 216 correspond to one another in a one-to-one manner.

Furthermore, the lower preforming portion 220 may include one or more lower connecting members 224 provided between the two lower extension members 222 and each having one side and the other side coupled to the two lower extension members 222, respectively, and one or more lower roller members 226 coupled to the lower connecting members 224 and configured to be rotatable about the lower connecting members 224, respectively. The lower connecting member 224 and the lower roller member 226 may be provided in plural. The lower connecting members 224 may be spaced from one another in the movement direction of the insulation sheet 50. The lower roller members 226 may be spaced from one another in the movement direction of the insulation sheet 50. Furthermore, the lower roller members 226 may also be spaced from one another in the width direction W. FIG. 2 and FIG. 3 illustrate that the plurality of lower connecting members 224 and the plurality of lower roller members 226 correspond to one another in a one-to-one manner.

Meanwhile, to form the preforming region 51 on the insulation sheet 50 during the preforming process, the upper preforming portion 210 and the lower preforming portion 220 need to press upper and lower surfaces of the insulation sheet 50 in the same region of the insulation sheet 50.

According to various exemplary embodiments of the present invention, the upper and lower roller members 216 and 226 of the upper and lower preforming portions 210 and 220 may directly press the insulation sheet 50. To the present end, the upper roller member 216 and the lower roller member 226 may face each other in the up-down direction thereof.

In more detail, referring to FIG. 4, an embossed region X protruding outward may be formed on an external circumferential surface (i.e., a surface that directly presses the insulation sheet) vertically formed on the upper roller member 216. A debossed region Y recessed inward and facing the embossed region X may be formed on an external circumferential surface (i.e., a surface that directly presses the insulation sheet) vertically formed on the lower roller member 226 facing the upper roller member 216 having the embossed region X. In the instant case, a region of the insulation sheet 50, which protrudes downward by the embossed region X, may be inserted into the debossed region Y. Therefore, in the case in which the upper roller member 216 has the embossed region X and the lower roller member 226 has the debossed region Y, the insulation sheet 50 may have a preforming region protruding downward and formed when the insulation sheet 50 passes through the preforming module 200.

In contrast, referring to FIG. 4, a debossed region Y recessed inward may be formed on the external circumferential surface vertically formed on the upper roller member 216. An embossed region X facing the debossed region Y may be formed on the external circumferential surface vertically formed on the lower roller member 226 facing the upper roller member 216 having the debossed region Y. In the instant case, a region of the insulation sheet 50, which protrudes upward by the embossed region X, may be inserted into the debossed region Y. Therefore, in the case in which the upper roller member 216 has the debossed region Y and the lower roller member 226 has the embossed region X, the insulation sheet 50 may have a preforming region protruding upwards.

Furthermore, according to various exemplary embodiments of the present invention, the upper roller member 216 may be attachable to and detachable from the upper connecting member 214. Alternatively, the lower roller member 226 may be attachable to and detachable from the lower connecting member 224. The upper roller member 216 may move in a longitudinal direction of the upper connecting member 214. Alternatively, the lower roller member 226 may move in a longitudinal direction of the lower connecting member 224. The present configuration may flexibly cope with a situation in which a portion of the insulation sheet on which the preforming region 51 or the bent region 52 is to be formed is changed when the insulation sheet is supplied to the preforming module 200. In the instant case, the configuration in which the upper roller member 216 may be attachable to and detachable from the upper connecting member 214 or the lower roller member 226 may be attachable to and detachable from the lower connecting member 224 may mean that the upper roller member 216 and the upper connecting member 214 may be repeatedly coupled to each other and the lower roller member 226 and the lower connecting member 224 may be repeatedly coupled to each other without irreversibly damaging the components of the insulation sheet forming apparatus 10.

Referring to FIGS. 1 to 7, the insulation sheet forming apparatus 10 according to various exemplary embodiments of the present invention may further include a bending module 300 configured to form the bent region 52 on the insulation sheet 50 by bending the insulation sheet 50 around the preforming region 51 formed on the insulation sheet 50 supplied from the preforming module 200.

The bending module 300 may include a first bending portion 310. In more detail, the first bending portion 310 may include: first guide members 312 disposed at two opposite sides in the width direction W of the insulation sheet 50 and configured to guide two opposite portions of the insulation sheet 50 toward the inside in the width direction W and move external regions of the insulation sheet 50 inward in the width direction W based on the preforming regions 51; and a first pressing member 314 disposed at a downstream side of the first guide member 312 in the movement direction of the insulation sheet 50 and configured to form the bent regions 52, from the preforming regions 51, by pressing the preforming regions 51 and portions adjacent to the preforming regions 51 in the up-down direction thereof. In more detail, the preforming regions 51 may become the bent regions 52 as the first pressing member 314 presses the preforming regions 51 and the portions adjacent to the preforming regions 51 in the upward/downward direction in a state in which the external regions of the insulation sheet 50 overlap each other in the upward/downward direction based on the preforming regions 51 when the two opposite portions of the insulation sheet 50 are guided inward in the width direction W based on the preforming regions 51 by the first guide members 312. For example, as illustrated in FIG. 5, a first curved surface region 312*a*, which protrudes toward the insulation sheet 50, i.e., the inside in the width direction W of the insulation sheet, may be formed on a portion of the first guide member 312 that comes into contact with the insulation sheet 50.

Meanwhile, the first bending portion 310 may further include a first forming member 316 disposed at a downstream side of the first pressing member 314 and having therein an internal space through which the insulation sheet 50 passes. The first forming member 316 may be configured to allow the insulation sheet 50, on which the bent regions 52 are formed by the first guide members 312 and the first pressing member 314, to be supplied to a second bending portion 320 (to be described below) while maintaining the bent regions 52. To the present end, according to various exemplary embodiments of the present invention, the internal space of the first forming member 316 may have a shape corresponding to a perpendicular cross-section of the insulation sheet 50 to be introduced into the first forming member 316.

Meanwhile, referring to FIGS. 1 to 7, the bending module 300 may further include the second bending portion 320 disposed at a downstream side of the first bending portion 310 in the movement direction of the insulation sheet 50. In more detail, the second bending portion 320 may include: second guide members 322 disposed at two opposite sides in the width direction W of the insulation sheet 50 and configured to guide two opposite portions of the insulation sheet 50 toward the inside in the width direction W and move the external regions of the insulation sheet 50 inward in the width direction W based on the preforming regions 51; and a second pressing member 324 disposed at a downstream side of the second guide member 322 in the movement direction of the insulation sheet 50 and configured to additionally form the bent regions 52, from the preforming regions 51, by pressing the preforming regions 51 and portions adjacent to the preforming regions 51 in the up-down direction thereof. In more detail, the preforming regions 51 may become the bent regions 52 as the second pressing member 324 presses the preforming regions 51 and the portions adjacent to the preforming region 51 in the upward/downward direction in a state in which the external regions of the insulation sheet 50 overlap each other in the upward/downward direction based on the preforming regions 51 when the two opposite portions of the insulation sheet 50 are guided inward in the width direction W based on the preforming regions 51 by the second guide members 322. For example, as illustrated in FIG. 5, a second curved surface region 322*a*, which protrudes toward the insulation sheet 50, i.e., the inside in the width direction W of the insulation sheet, may be formed on a portion of the second guide member 322 that comes into contact with the insulation sheet 50.

That is, according to various exemplary embodiments of the present invention, some of the plurality of preforming regions 51 formed on the insulation sheet 50 by the preforming module 200 may become the bent regions 52 by the first bending portion 310, and some of the remaining preforming regions 51 may become the bent regions 52 by the second bending portion 320. The preforming region 51 pressed by the first bending portion 310 may be positioned outward in the width direction W from the preforming region 51 pressed by the second bending portion 320.

Meanwhile, the second bending portion 320 may further include a second forming member 326 disposed at a downstream side of the second pressing member 324 and having therein an internal space through which the insulation sheet 50 passes. Unlike the first forming member 316, the second forming member 326 may be configured to additionally form the bent region 52 in addition to the bent regions 52 formed by the first guide members 312, the first pressing member 314, the second guide members 322, and the second pressing member 324. According to various exemplary embodiments of the present invention, to additionally form the bent region 52 from the preforming region 51 on the insulation sheet 50 having passed through the second forming member 326, the internal space of the second forming member 326 may have a shape different from a vertical cross-section of the insulation sheet 50 before the insulation sheet 50 passes through the second forming member 326. Therefore, according to various exemplary embodiments of the present invention, the insulation sheet 50 interferes with the second forming member 326 in the internal space of the second forming member 326 while passing through the second forming member 326 such that the insulation sheet 50 may be additionally bent around the preforming region 51, and the bent region 52 may be additionally formed.

Meanwhile, according to various exemplary embodiments of the present invention, the first forming member 316 and the second forming member 326 may be attachable to and detachable from in the insulation sheet forming apparatus 10. In the instant case, the insulation sheet forming apparatus 10 may flexibly cope with a change in shape of the insulation sheet 50 or a change in region where the bent region 52 is formed, implementing the insulation sheets 50 having various shapes.

Referring to FIGS. 1 to 7, the insulation sheet forming apparatus 10 according to various exemplary embodiments of the present invention may further include a cutting module 400 configured to cut the insulation sheet 50 supplied from the bending module 300, and an insertion module 500 configured to insert the insulation sheet 50, which has been cut by the cutting module 400, into a stator core C or the like.

Figure 8:
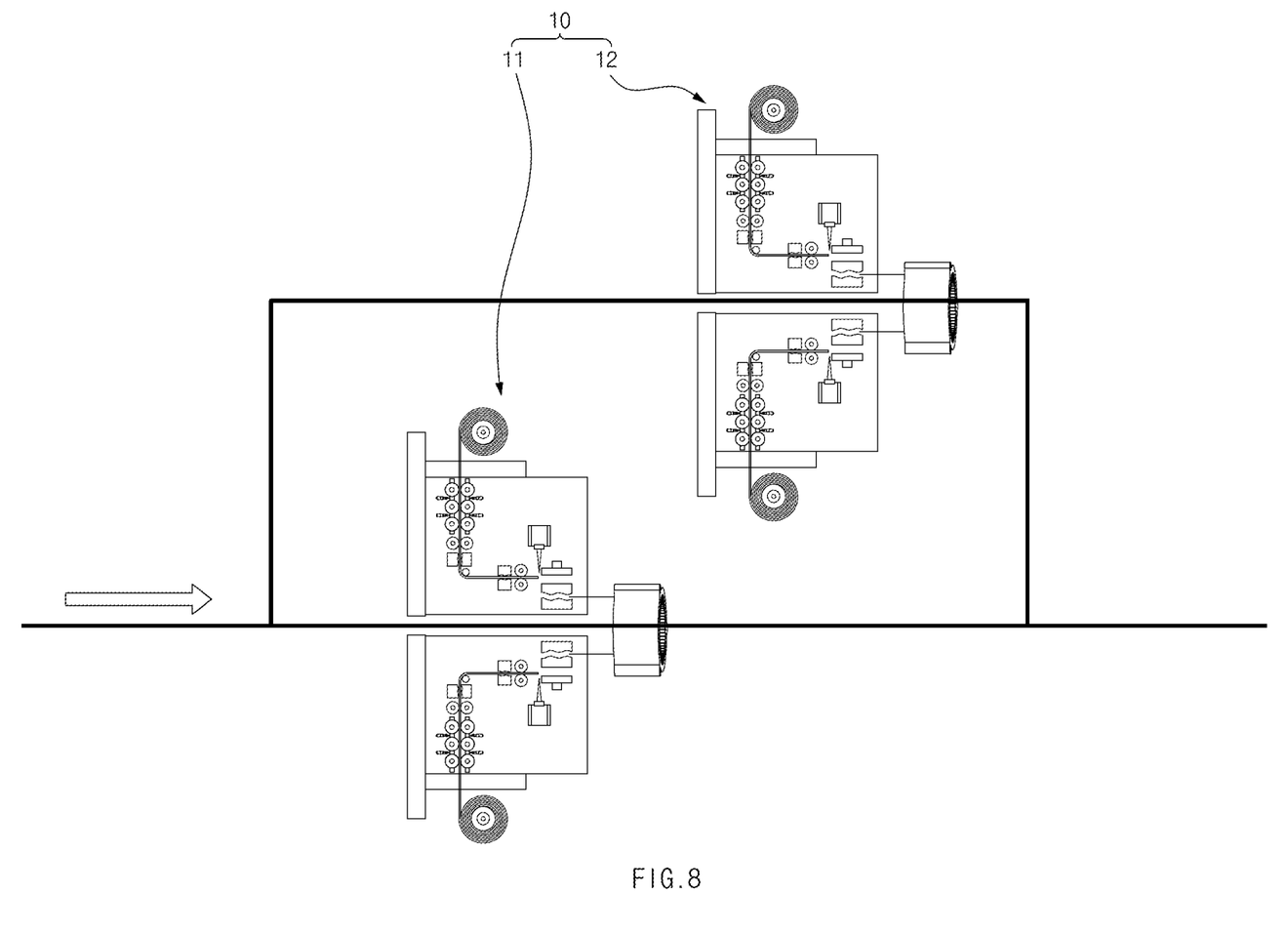
FIG. 8 is a view exemplarily illustrating a structure of an insulation sheet forming apparatus according to various exemplary embodiments of the present invention.

FIG. 8 is a view exemplarily illustrating a structure of an insulation sheet forming apparatus according to various exemplary embodiments of the present invention.

Referring to FIG. 8, the insulation sheet forming apparatus 10 according to various exemplary embodiments of the present invention may include a first insulation sheet forming apparatus 11 and a second insulation sheet forming apparatus 12.

The first insulation sheet forming apparatus 11 and the second insulation sheet forming apparatus 12 may each include: the unwinding module 100 configured to unwind and supply the insulation sheet 50; the preforming module 200 configured to form the preforming region 51 on the insulation sheet 50 by pressing a partial region of the insulation sheet 50 to form the bent region 52 on the insulation sheet 50 supplied from the unwinding module 100; and the bending module 300 configured to form the bent region 52 on the insulation sheet 50 by bending the insulation sheet 50 around the preforming region 51 formed on the insulation sheet 50 supplied from the preforming module 200. The preforming module 200 has a width which may be adjusted in the width direction W that intersects the movement direction of the insulation sheet 50.

In the instant case, according to the exemplary embodiment of the present invention, the first insulation sheet forming apparatus 11 and the second insulation sheet forming apparatus 12 may be disposed in parallel so that the insulation sheet 50 may be selectively supplied to the first insulation sheet forming apparatus 11 or the second insulation sheet forming apparatus 12.

According to the exemplary embodiment of the present invention, the insulation sheet 50 may be selectively supplied to the first insulation sheet forming apparatus 11 or the second insulation sheet forming apparatus 12 depending on the size of the insulation sheet 50 or the position of the bent region 52 to be formed on the insulation sheet 50. As a result, it is possible to form the insulation sheets 50 having various shapes without separately changing facilities.

Meanwhile, the descriptions of the first insulation sheet forming apparatus 11 and the second insulation sheet forming apparatus 12 according to the exemplary embodiment of the present invention may be replaced with the above-mentioned description of the insulation sheet forming apparatus 10 according to various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An insulation sheet forming apparatus, which forms an insulation sheet having one or more bent regions, the insulation sheet forming apparatus comprising:
    an unwinding module configured to unwind and supply the insulation sheet;
    a preforming module configured to form a preforming region on the insulation sheet by pressing a partial region of the insulation sheet to form the one or more bent regions on the insulation sheet supplied from the unwinding module; and
    a bending module configured to form the one or more bent regions on the insulation sheet by bending the insulation sheet around the preforming region formed on the insulation sheet supplied from the preforming module,
    wherein the preforming module includes:
        an upper preforming portion disposed at an upper side of the preforming module; and
        a lower preforming portion disposed below the upper preforming portion, and
    wherein the preforming module has a width which is adjustable in a width direction that intersects a movement direction of the insulation sheet,
    wherein the bending module includes a first bending portion, and
    wherein the first bending portion includes first guide members disposed at two opposite sides in the width direction of the insulation sheet and configured to guide two opposite ends in the width direction of the insulation sheet inward in the width direction and move external regions of the insulation sheet inward in the width direction based on preforming regions.

2. The insulation sheet forming apparatus of claim 1,
    wherein the upper preforming portion includes two upper extension members extending in the movement direction of the insulation sheet and spaced from each other in the width direction,
    wherein the lower preforming portion includes two lower extension members extending in the movement direction of the insulation sheet and spaced from each other in the width direction, and
    wherein at least one of the two upper extension members is movable in the width direction to adjust a distance between the two upper extension members or at least one of the two lower extension members is movable in the width direction to adjust a distance between the two lower extension members.

3. The insulation sheet forming apparatus of claim 1, wherein the upper preforming portion or the lower preforming portion is movable in an up-down direction to adjust a distance between the upper preforming portion and the lower preforming portion.

4. The insulation sheet forming apparatus of claim 2, wherein the upper preforming portion includes:
    one or more upper connecting members disposed between the two upper extension members and each having a first side and a second side coupled to the two upper extension members, respectively; and
    one or more upper roller members coupled to the one or more upper connecting members and provided to be rotatable about the one or more upper connecting members, respectively, and
    wherein the lower preforming portion includes:
    one or more lower connecting members disposed between the two lower extension members and each having a first side and a second side coupled to the two lower extension members, respectively; and
    one or more lower roller members coupled to the one or more lower connecting members and provided to be rotatable about the one or more lower connecting members, respectively.

5. The insulation sheet forming apparatus of claim 4, wherein the one or more upper roller members and the one or more lower roller members face each other.

6. The insulation sheet forming apparatus of claim 5,
    wherein an embossed region vertically protrudes outwards from an external circumferential surface of the one or more upper roller members, and,
    wherein a debossed region facing the embossed region is vertically recessed inward from an external circumferential surface of the one or more lower roller members facing the one or more upper roller members and, wherein the debossed region faces the embossed region, and wherein a region of the insulation sheet, which is recessed downward by the embossed region, is inserted into the debossed region.

7. The insulation sheet forming apparatus of claim 5,
wherein a debossed region is vertically recessed inward from an external circumferential surface of the one or more upper roller members,
wherein an embossed region facing the debossed region protrudes outwards from an external circumferential surface of the one or more lower roller members facing the one or more upper roller members, and
wherein a region of the insulation sheet, which is recessed upward by the embossed region, is inserted into the debossed region.

8. The insulation sheet forming apparatus of claim 4, wherein the one or more upper roller members is attachable to and detachable from the one or more upper connecting members or the one or more lower roller members is attachable to and detachable from the one or more lower connecting members.

9. The insulation sheet forming apparatus of claim 4, wherein the one or more upper roller members is moved in a longitudinal direction of the one or more upper connecting members or the one or more lower roller members is movable in a longitudinal direction of the one or more lower connecting members.

10. The insulation sheet forming apparatus of claim 1, wherein the first bending portion further includes:
a first pressing member disposed at a downstream side of the first guide members in the movement direction of the insulation sheet and configured to form the one or more bent regions by pressing the preforming regions and portions adjacent to the preforming regions in an up-down direction of the insulation sheet.

11. The insulation sheet forming apparatus of claim 10, wherein the first bending portion further includes a first forming member disposed at a downstream side of the first pressing member and having therein an internal space through which the insulation sheet passes, and
wherein the internal space of the first forming member has a shape corresponding to a vertical cross-section of the insulation sheet introduced into the first forming member.

12. The insulation sheet forming apparatus of claim 1, wherein a first curved surface region, which protrudes toward the insulation sheet, is formed on a portion of the first guide member that comes into contact with the insulation sheet.

13. The insulation sheet forming apparatus of claim 10, wherein the bending module further includes a second bending portion, and wherein the second bending portion includes:
second guide members disposed at two opposite sides in the width direction of the insulation sheet and configured to guide two opposite portions of the insulation sheet inward in the width direction and move external regions of the insulation sheet inward in the width direction based on preforming regions; and
a second pressing member disposed at a downstream side of the second guide members in the movement direction of the insulation sheet and configured to additionally form one or more bent regions by pressing the preforming regions and portions adjacent to the preforming regions in the up-down direction thereof.

14. The insulation sheet forming apparatus of claim 13, wherein the second bending portion further includes a second forming member disposed at a downstream side of the second pressing member and having therein an internal space through which the insulation sheet passes, and
wherein the internal space of the second forming member has a shape different from a vertical cross-section of the insulation sheet, before the insulation sheet passes through the second forming member, to additionally form one or more bent regions on the insulation sheet having passed through the second forming member.

15. The insulation sheet forming apparatus of claim 13, wherein a second curved surface region, which protrudes toward the insulation sheet, is formed on a portion of the second guide members that come into contact with the insulation sheet.

16. The insulation sheet forming apparatus of claim 11, wherein the first forming member is attachable and detachable from the insulation sheet forming apparatus.

17. The insulation sheet forming apparatus of claim 14, wherein the second forming member is attachable and detachable from the insulation sheet forming apparatus.

18. An insulation sheet forming apparatus, which forms an insulation sheet having one or more bent regions, the insulation sheet forming apparatus comprising:
a first insulation sheet forming apparatus; and
a second insulation sheet forming apparatus,
wherein each of the first insulation sheet forming apparatus and the second insulation sheet forming apparatus includes:
an unwinding module configured to unwind and supply the insulation sheet;
a preforming module configured to form a preforming region on the insulation sheet by pressing a partial region of the insulation sheet to form the one or more bent regions on the insulation sheet supplied from the unwinding module; and
a bending module configured to form the one or more bent regions on the insulation sheet by bending the insulation sheet around the preforming region formed on the insulation sheet supplied from the preforming module,
wherein the preforming module has a width which is adjustable in a width direction that intersects a movement direction of the insulation sheet,
wherein the first insulation sheet forming apparatus and the second insulation sheet forming apparatus are disposed in parallel so that the insulation sheet is selectively supplied to the first insulation sheet forming apparatus or the second insulation sheet forming apparatus,
wherein the bending module includes a first bending portion, and
wherein the first bending portion includes first guide members disposed at two opposite sides in the width direction of the insulation sheet and configured to guide two opposite ends in the width direction of the insulation sheet inward in the width direction and move external regions of the insulation sheet inward in the width direction based on preforming regions.

19. The insulation sheet forming apparatus of claim 18, wherein the insulation sheet is selectively supplied to the first insulation sheet forming apparatus or the second insulation sheet forming apparatus depending on a size of the insulation sheet or a position of the one or more bent regions to be formed on the insulation sheet.

* * * * *